United States Patent [19]
Keyes et al.

[11] 3,942,457
[45] Mar. 9, 1976

[54] WATER-BORNE CRAFT HAVING MIX TANK OR THE LIKE MOVABLE BETWEEN ELEVATED AND LOWERED POSITIONS

[75] Inventors: Richard E. Keyes; Ralph E. Lingert, both of Cincinnati, Ohio

[73] Assignee: The Finn Equipment Company, Cincinnati, Ohio

[22] Filed: May 20, 1974

[21] Appl. No.: 471,355

[52] U.S. Cl. ............................ 114/61; 47/9; 111/1; 114/.5 R
[51] Int. Cl.². ... A01G 7/00; B63B 1/12; B63B 27/26
[58] Field of Search .......... 114/61, 43.5, 26, 51, 52, 114/53, .5 R; 239/127; 37/71, 55

[56] References Cited
UNITED STATES PATENTS

| | | | |
|---|---|---|---|
| 1,097,335 | 5/1914 | Koesis................................... | 114/53 |
| 1,201,051 | 10/1916 | Jack ................................... | 114/.5 T |
| 1,997,149 | 4/1935 | Lake ......................................... | 37/55 |
| 2,878,617 | 3/1959 | Finn................................. | 239/127 X |
| 3,139,060 | 6/1964 | Dane............................... | 239/182 X |
| 3,572,274 | 3/1971 | Brauer et al. ....................... | 114/43.5 |
| 3,791,327 | 3/1972 | Deueney........................... | 114/66 X |
| 3,804,177 | 4/1974 | Renfroe............................. | 37/71 X |
| 3,835,802 | 9/1974 | Vernede et al. .................... | 114/43.5 |

Primary Examiner—Trygve M. Blix
Assistant Examiner—Gregory W. O'Connor
Attorney, Agent, or Firm—J. Warren Kinney, Jr.

[57] ABSTRACT

A water-borne craft is supported by laterally spaced pontoons, wherein an open-topped receptacle mounted in the open space between the pontoons is movable between a fully elevated position wherein the bottom of the receptacle is at or above the water line of the craft and a fully lowered position wherein the bottom of the receptacle is submerged beneath the water line and the open top of the receptacle is above the water line. Water and materials are introduced into and mixed in the receptacle when in a fully lowered position, after which the mixture is pumped from the receptacle and discharged under pressure through a nozzle.

16 Claims, 10 Drawing Figures

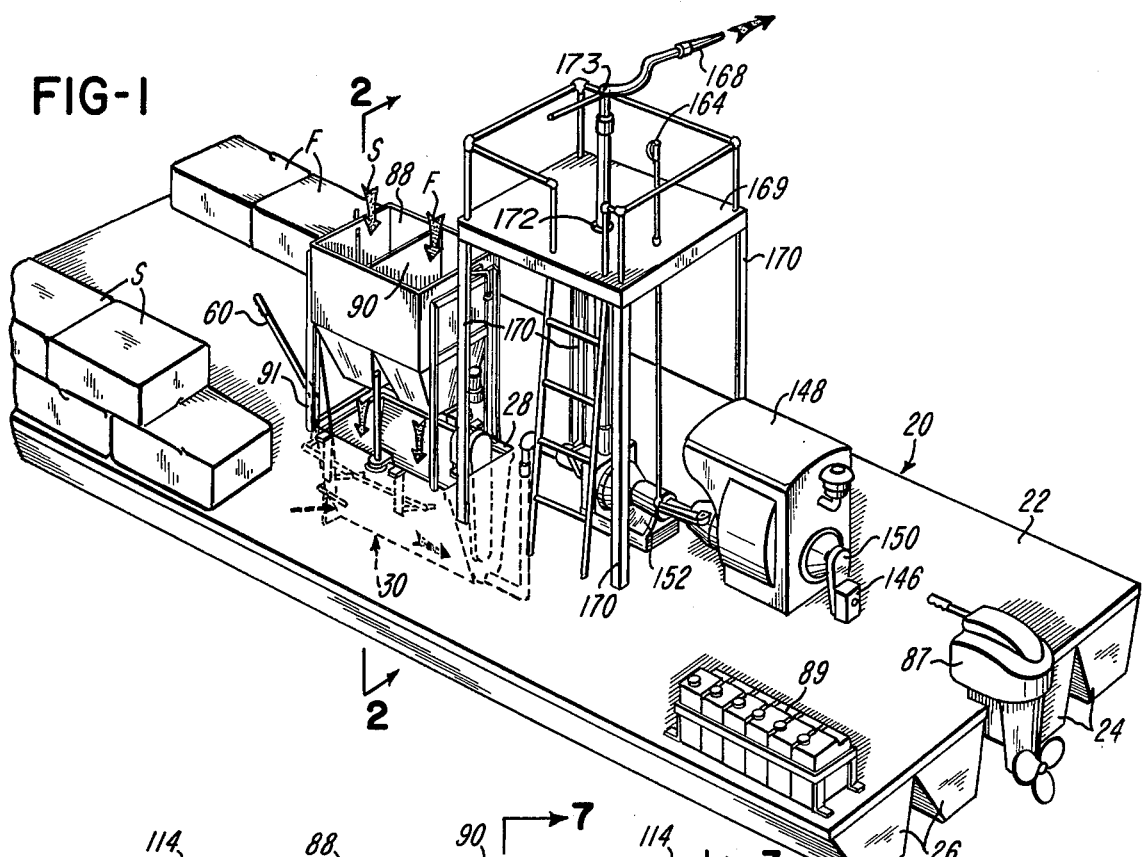
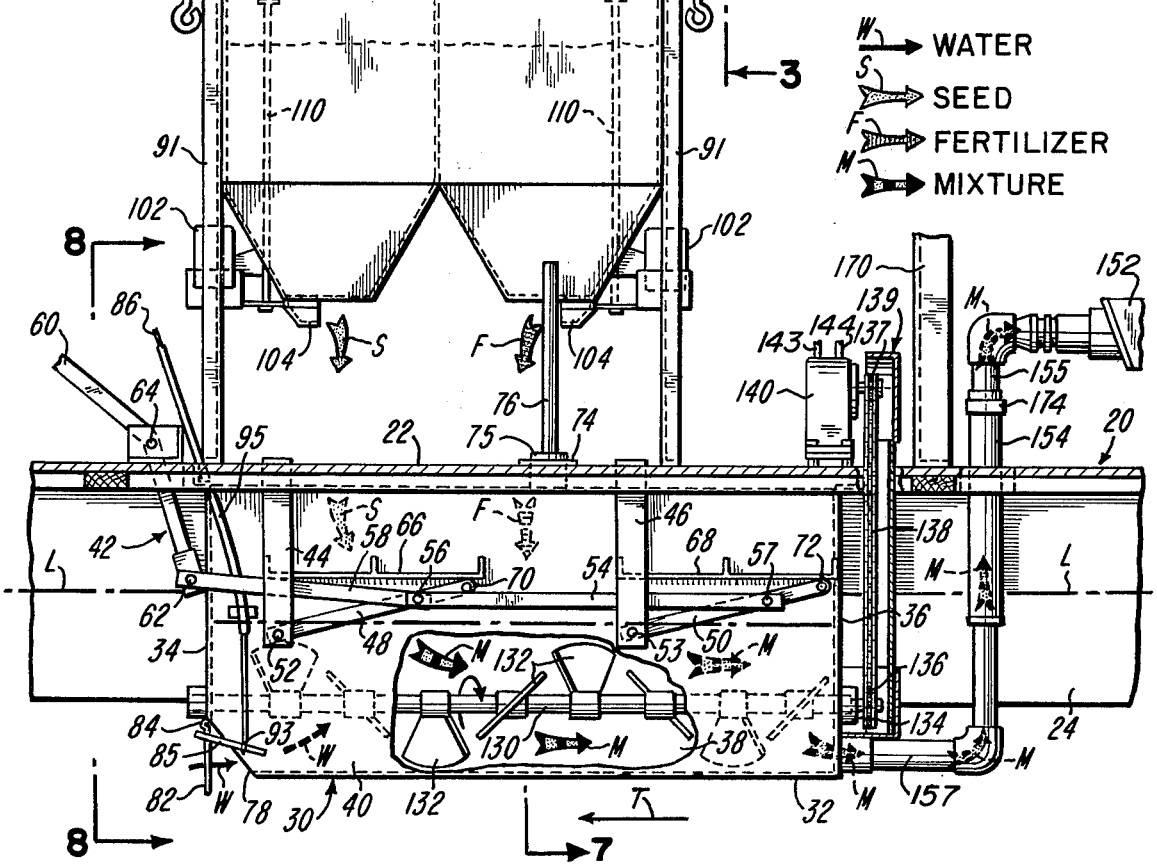

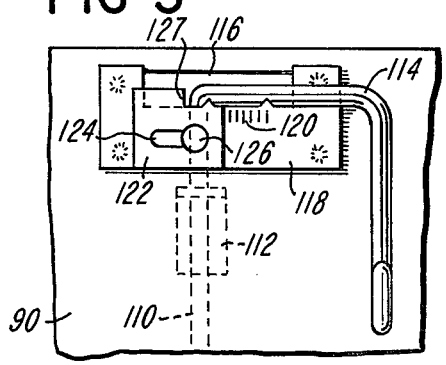
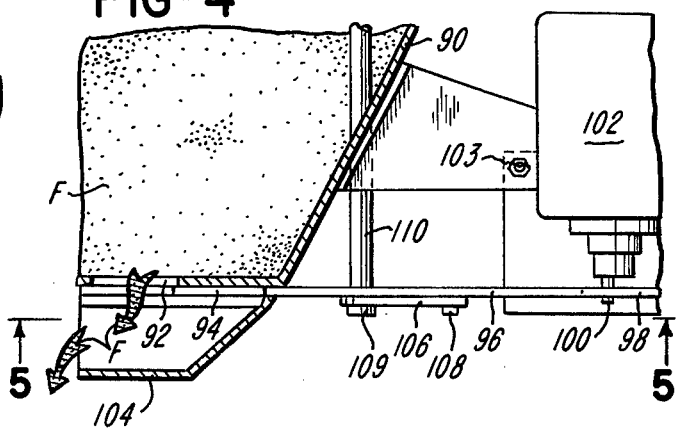
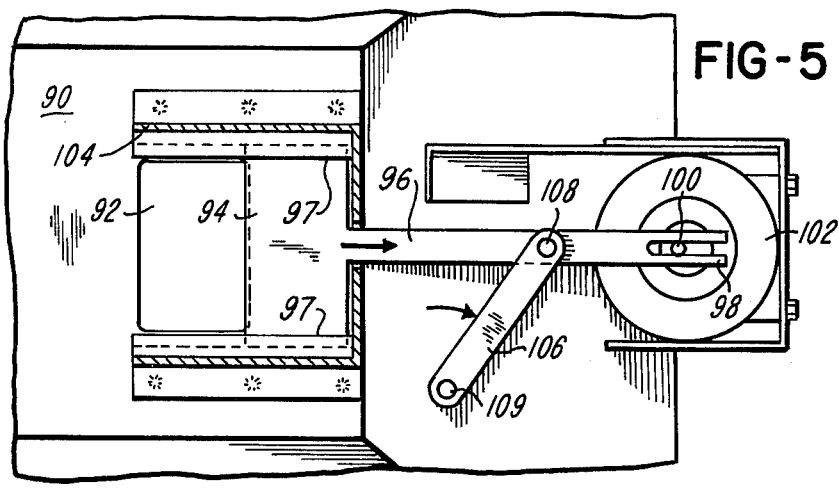
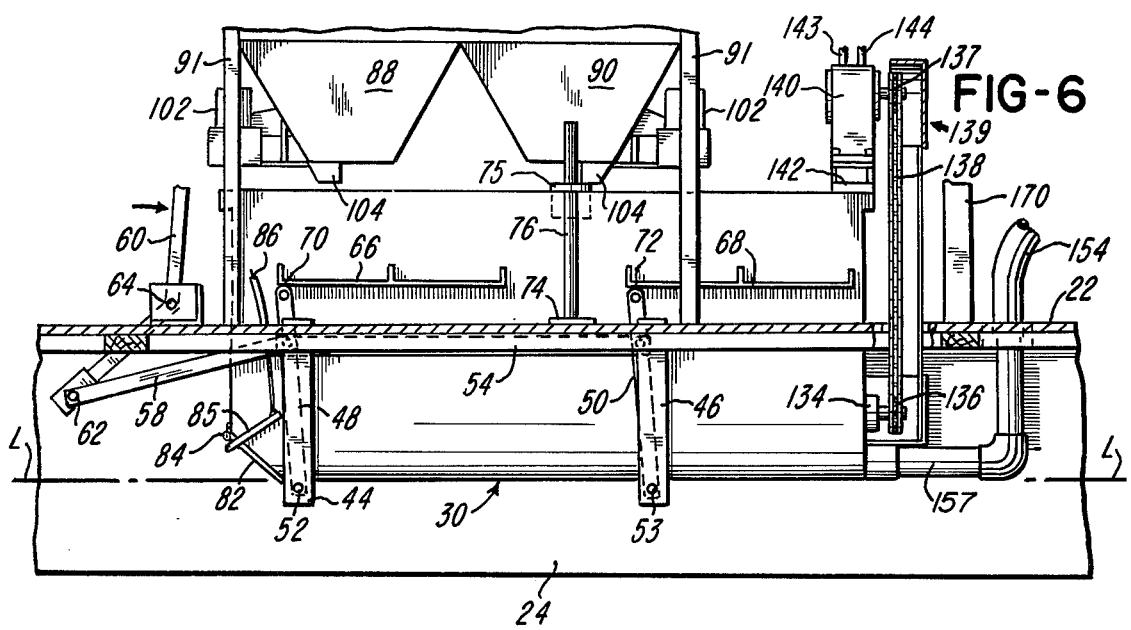

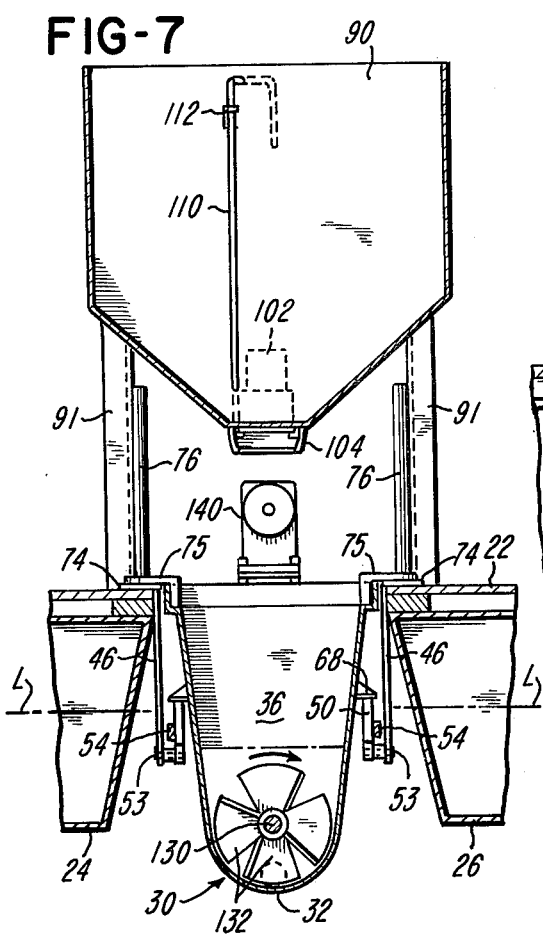
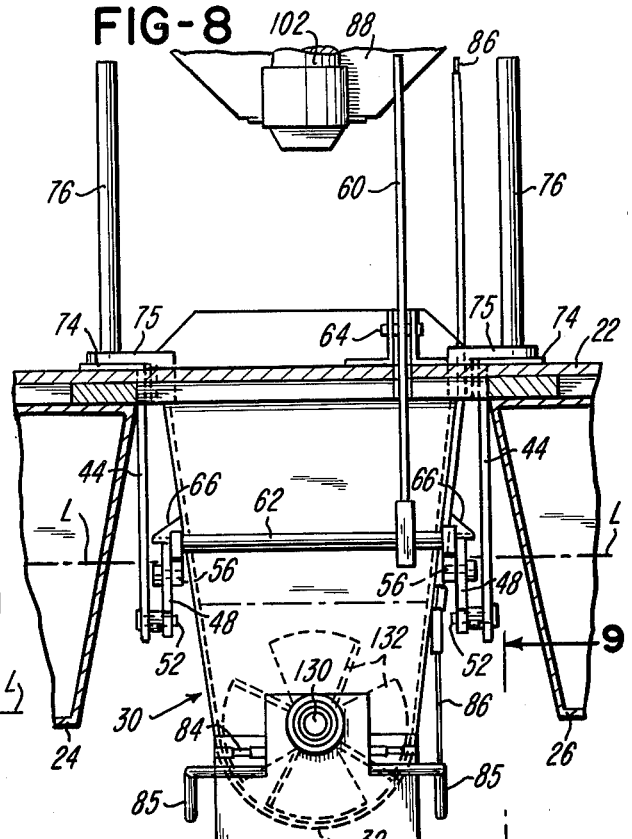
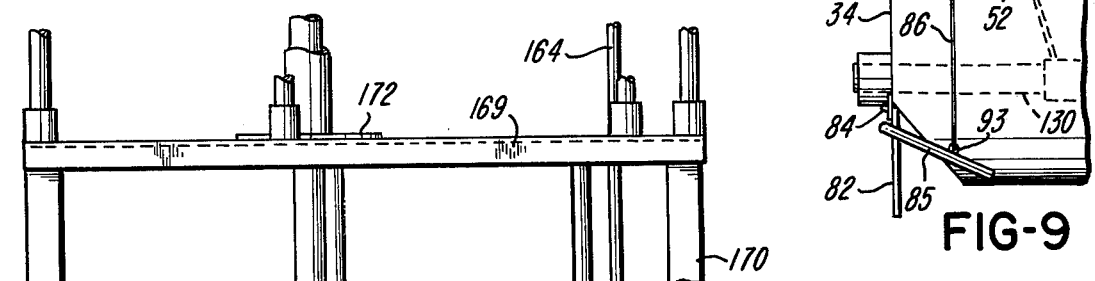
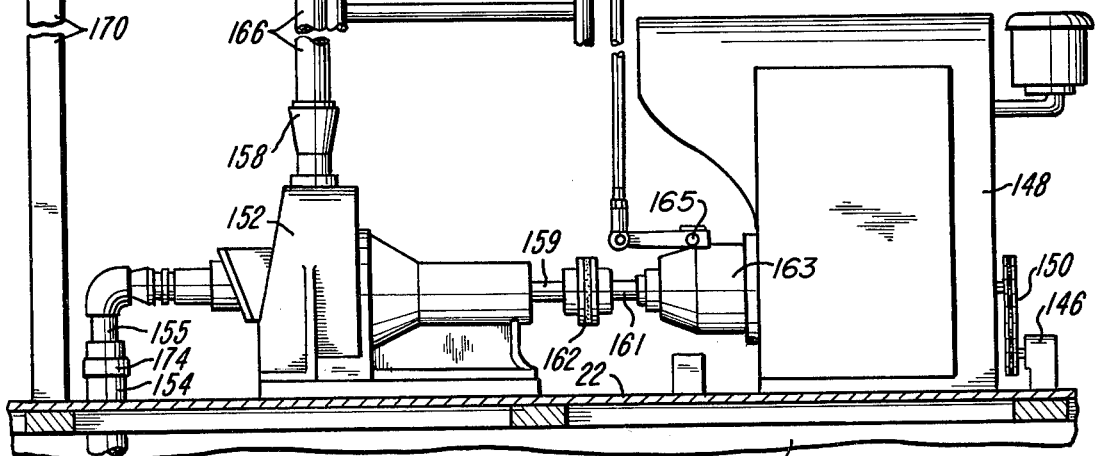

WATER-BORNE CRAFT HAVING MIX TANK OR THE LIKE MOVABLE BETWEEN ELEVATED AND LOWERED POSITIONS

BACKGROUND OF THE INVENTION

1. Field of the Invention

The present invention is directed to floating structures having submergible receptacles mounted thereon for movement between a fully lowered, substantially submerged position and a fully elevated position wherein the bottom of the receptacle is at or above the waterline of the craft. The present invention is particularly adapted for use in combination with apparatus for producing aqueous solutions, wherein various ingredients are mixed with water in the receptacle when in the fully lowered position. Generally, means are provided for pumping said solution from the receptacle for discharge under pressure through a nozzle.

2. Description of the Prior Art

Heretofore, watercraft equipped with spraying units or the like have comprised tanks or reservoirs which were mounted on and carried by the craft, generally above the waterline thereof, as disclosed, for example, in U.S. Pat. No. 3,139,060.

The present invention provides a watercraft wherein a tank or receptacle is movable between a fully elevated position and a fully lowered position. When the tank is not in use, it may be elevated to a position wherein the bottom of the receptacle is at or above the waterline of the craft thereby ensuring maneuverability of the craft with minimum drag. When the craft is moved to a desired location, the tank may be lowered to a partially submerged position, wherein water forming the base for an aqueous solution or the like may be drawn from the body of water into the tank without aid of a pump or similar means.

The watercraft and receptacle of the present invention is particularly suited for use with hydraulic spraying units or the like for enabling particulate seeds and/or fertilizer, as well as other materials such as liquid herbicides or insecticides to be sprayed onto the shoreline of a lake, reservoir, stream or the like, utilizing the body of water as the source for the base of an aqueous solution. In this manner, a large quantity of seed, fertilizer and the like may be carried by the craft without requiring the additional storage space needed for the water base of the solution. Generally, means are provided in the tank for mixing the various ingredients with the water while the craft is at the desired location. Spraying units such as disclosed in U.S. Pat. No. 2,878,617, issued to and owned by the assignee of this application, may be connected to the tank for discharging the resulting solution under pressure through a nozzle. Of course, it should be understood that the present invention is adapted for use with various other apparatus, as well, and the description of this, the preferred embodiment, is but one example thereof.

Therefore, it is the primary object of the present invention to provide a watercraft with a tank or receptacle which may be elevated to a position at or above the waterline of the craft, minimizing the drag created thereby when the watercraft is maneuvered about in a body of water, and to provide a tank which draws water directly from the body of water without aid of a pump or the like when the tank is lowered to a partially submerged position.

It is further an object of the invention to provide a receptacle adapted for use with apparatus for producing an aqueous solution by adding various ingredients to a natural water supply and for discharging the resultant solution under pressure through a nozzle or the like.

Other objects and features of the invention will be readily apparent from the accompanying drawings and description.

SUMMARY OF THE INVENTION

The water-borne craft of the present invention is generally of the type supported by a pair of laterally spaced pontoons. A receptacle is disposed in the open space intermediate the pontoons and is secured to said pontoons by a control mechanism for moving the receptacle between a fully lowered position wherein the bottom of the receptacle is adjacent the bottom of the pontoons and a fully elevated position wherein the bottom of the receptacle is at or above the waterline of the craft. Therefore, the craft is subject to minimum drag and is easily maneuvered when the receptacle is in the fully elevated position. When in the fully lowered position, the receptacle is partially submerged, thereby permitting water to be drawn directly from the body of water into the receptacle without aid of a pump or the like.

While it will be understood the present invention is readily adapted for use in myriad applications, it has been found particularly advantageous for use with apparatus for producing an aqueous solution which is to be discharged under pressure through a nozzle onto the shoreline of a lake or the like.

Therefore, the preferred embodiment of the invention includes a plurality of containers or bins for housing seed, fertilizer and the like which may be selectively added to the receptacle. An inlet port is provided in one end of the receptacle and is submerged when the receptacle is in the fully lowered position thereby drawing water from the body of water into the receptacle. An agitator is provided in the receptacle for agitating and thoroughly mixing the ingredients deposited in the receptacle from the containers with the water entering through said inlet port. The intake of a pump is disposed in communication with the receptacle and the exhaust thereof is coupled to a directional nozzle for discharging the resulting aqueous solution under pressure.

While the embodiments described herein disclose apparatus for mixing particulate ingredients such as seed and fertilizer with the water, it should be understood that the present invention is readily adapted for use with other ingredients whether liquid or solid in nature.

BRIEF DESCRIPTION OF THE DRAWINGS

FIG. 1 is a perspective view illustrating the water borne craft and receptacle of the present invention.

FIG. 2 is a sectional view taken at line 2—2 of FIG. 1, illustrating the receptacle in the fully lowered position, enlarged for clarity of detail and understanding.

FIG. 3 is a view taken at line 3—3 of FIG. 2.

FIG. 4 is a fragmentary view, partially in section, illustrating the discharge end of one of the storage bins of the preferred embodiment, enlarged for clarity of detail and understanding.

FIG. 5 is a sectional view taken at line 5—5 of FIG. 4.

FIG. 6 is a view similar to FIG. 2, illustrating the receptacle in the fully elevated position.

FIG. 7 is a sectional view taken at line 7—7 of FIG. 2.

FIG. 8 is a sectional view taken at line 8—8 of FIG. 2, enlarged for clarity of detail and understanding.

FIG. 9 is a view taken at line 9—9 of FIG. 8.

FIG. 10 is a fragmentary view showing the pump and engine assembly of the preferred embodiment, enlarged for clarity of detail and understanding.

DESCRIPTION OF THE PREFERRED EMBODIMENT

The water borne craft 20 of the present invention generally includes deck 22 supported by a pair of laterally spaced pontoons 24, 26 extending the length thereof, wherein central opening 28 in the deck corresponds with the open space intermediate the pontoons. Tank or receptacle 30 having bottom wall 32, opposite end walls 34, 36 and opposite side walls 38, 40 (see FIG. 2) is disposed in the central opening and is secured to the deck and pontoons by control mechanism 42.

The control mechanism is operable to move receptacle 30 between a fully lowered position (FIG. 1) wherein the bottom of the receptacle is beneath waterline L of the craft and a fully elevated position (FIG. 6) wherein the bottom of the receptacle is at or above the waterline. Uniformly satisfactory results have been obtained with parallelogram linkage 52 illustrates in the drawings, wherein supports 44, 46 are secured to and depend from deck 22 at each side of receptacle 30, see FIGS. 2, 6, 7 and 8. A set of lifting arms 48, 50 are pivotally secured at 52, 53 to each pair of supports 44, 46, respectively, and at 56, 57 to link 54. One end of each link 58 is pivotally secured at 56 to arm 48 and link 54, and the other end of each link 58 is secured at 62 to control lever 60. Control lever 60 is pivotally mounted on deck 22 at 64 and simultaneously actuates each pair of arms 48, 50 for disposing and locking said receptacle in and against accidental or unintentional dislodgment from its fully raised position (FIG. 6) and fully lowered position (FIG. 2). A pair of elongate guides 66, 68 are secured to each side wall of the receptacle intermediate the top and bottom thereof and are adapted to engage ends 70, 72 of corresponding lifting arms 48, 50 respectively. Thus, when lever 60 is pivoted at 64 from the position of FIG. 2 to the position of FIG. 6, receptacle 30 is moved from the fully lowered position to the fully elevated position. Brackets 75, secured to each side of receptacle 30, are adapted to receive a corresponding vertical post 76, each of which is secured to deck 22 at corresponding seat 74. The brackets and posts provide vertical guides for the receptacle as it is raised and lowered by movement of lever 60.

In the preferred embodiment, receptacle 30 includes a normally open inlet port 78 at end 34 thereof. The inlet port is submerged when the receptacle is in the fully lowered position and permits unrestricted entry of water into the receptacle from the body of water. Gate 82 is hingedly secured to the receptacle at 84 and includes extension 85 fixedly secured thereto as shown in FIGS. 8 and 9. Cable 86, attached to extension 85 at 93, is carried in cable housing 95 to deck 22, see FIG. 2, for controlling the position of the gate relative to the inlet port, permitting selective closing thereof when desired.

Generally, the watercraft of the present invention includes propelling means such as, by way of example, motor 87 mounted at the stern end of deck 22 intermediate pontoons 24, 26. Therefore, it is advantageous that inlet port 78 be in end 34 of receptacle 30 adjacent the bow end of the craft, thereby facilitating flow of water W into the receptacle 30 as the craft is advanced through the water. The gate acts as a deflector or shield not only minimizing the danger of foreign objects entering receptacle 30 through port 78, but also acts as a water restrictor to keep water from entering the receptacle too fast and flowing over the sides of receptacle 30 when the watercraft is traveling in the direction indicated by arrow T in FIG. 2. As a matter of convenience, fuel reservoirs 89 are secured to and carried by deck 22. The fuel reservoirs are connected to motor 87 by suitable means, not shown.

Containers or bins 88, 90 are secured to and carried by the deck of the water craft by a plurality of rigid, upright standards 91 and are disposed directly above the open top of receptacle 30 at a height sufficient to allow unrestricted raising and lowering thereof. The containers house various ingredients such as, by way of example, solid particulate seed S and fertilizer F which may be stored in large quantities on deck 22, as shown in FIG. 1. It should be understood that various other containers could be substituted for those illustrated such as, by way of example, containers of the type adapted for housing liquid insecticides, herbicides or the like, without departing from the scope of the present invention.

The bins each include opening 92 and gate 94 in the bottom thereof for controlling the discharge of ingredients from the bins into receptacle 30, see particularly FIGS. 4 and 5. Gate 94 is slidably carried on tracks 97 and includes elongated extension 96 having slotted end 98 which receives eccentric drive 100 of motor 102. The motor is mounted on bin 90 at 103 and is powered by a suitable power source, not shown. The shaft of motor 102 rotates eccentric 100 casing reciprocating motion in gate 94, thereby selectively discharging ingredients into receptacle 30. Chute 104 depends from bin 90 in the vicinity of opening 92 and minimizes spillage as the ingredients are discharged.

Lever 106 is pivotally secured at 108 to extension 96 of the gate and is fixedly secured at 109 to control rod 110. The control rod passes through a suitable aperture in bin 90 and is rotatably mounted on an interior wall of the bin at bracket 112, see FIG. 3. Upper end 114 of the control rod is in the form of an inverted U and passes through slot 116 provided in the bin wall. Bracket 118 is fixedly secured to the exterior of the bin adjacent slot 126 with locking bracket 122 adjustably mounted thereon. Tab 127 projects from locking bracket 122 and selectively limits the rotation of rod 110. The locking bracket includes slot 124 for receiving screw 126 which is carried by bracket 118. When the screw is loosened, bracket 122 may be slidably adjusted with respect to bracket 118, controlling the opening at gate 94. Control arm 110 is illustrated in FIG. 3 in the gate closed position. However, since bracket 118 is at the extreme left, as illustrated, control arm 110 may be rotated about its longitudinal axis without restriction, moving gate 94 to the fully open position shown in FIG. 5. Calibrations 120 in bracket 118 facilitate accurate adjustment of bracket 122. It should be understood various other gates and gate control mechanisms could be utilized herein without departing from the scope and spirit of the present invention.

Elongate shaft 130 is rotatably mounted at ends 34 and 36 of receptacle 30 and includes a plurality of impellors 132 mounted thereon for agitating and thoroughly mixing the ingredients discharged from bins 88 and 90 with the water therein, as shown in FIG. 2. The shaft is powered by suitable means such as, by way of example, the chain drive mechanism 139 comprising sprocket gear 136 mounted on end 134, drive gear 137 driven by hydraulic motor 140 and chain 138. The hydraulic motor is mounted directly on receptacle 30 at 142, as shown in FIG. 6, and moves therewith as the receptacle is moved between the fully elevated and fully lowered positions. In the preferred embodiment, motor 140 is powered by hydraulic pump 146 which is coupled to the motor by flexible hoses 143, 144. The hydraulic pump is secured to deck 22 and is driven by engine 148 via the belt or chain drive contained in housing 150.

Discharge pump 152 is secured to and carried by deck 22 and includes intake side 155 and discharge side 158. Conduit 157, in communication with the interior of receptacle 30 at end 36 thereof, is coupled to intake side 155 via a suitable connector such as, by way of example, flexible hose 154 and the quick disconnect coupling diagrammatically illustrated at 174. The disconnect coupling provides means for uncoupling pump 152 from the hose, conduit and receptacle when the receptacle is to be moved from the fully lowered to the fully elevated position, see FIG. 6.

Elevated platform 169, supported by uprights 170, carries nozzle 168, rotatably mounted at 172 and pivotable about point 173. The nozzle is coupled to the discharge side of pump 152 by suitable conduit 166 and provides means for controlling the direction and spray pattern of contents M discharged therethrough.

The discharge pump is driven by engine 148 via pump shaft 159 and engine shaft 161 which are coupled by suitable means such as, by way of example, friction drive coupling 162. A clutch mechanism for selectively engaging and disengaging drive shaft 161 is contained in housing 163 and is coupled at 165 to clutch control arm 164. The clutch control arm extends through platform 169 and is mounted thereon in the vicinity of nozzle 168.

From the foregoing it will be noted that I have provided a watercraft of the type generally supported by a pair of laterally spaced pontoons. A receptacle is disposed in the space intermediate the pontoons and is secured to said pontoons in such a manner that the receptacle is selectively movable between a fully lowered position wherein the bottom of the receptacle is beneath the waterline of the craft and a fully elevated position wherein the bottom of the receptacle is at or above the waterline. While I have illustrated the structure of the present invention in combination with apparatus for mixing and spraying an aqueous solution containing a variety of ingredients, it should be understood that such use is not intended to be either limiting or restrictive. Further, while the preferred embodiment has been particularly described herein, it should be understood that various modifications and alterations may be made thereto without departing from the scope and spirit of my invention as defined by the claims appended hereto.

What is claimed is:

1. A water-borne craft for floating on a body of water, comprising laterally spaced apart pontoons, a deck supported on and spanning the space between the pontoons, said deck having an opening therethrough between the pontoons, an open top receptacle carried by the deck and having opposite side walls, opposite end walls and a bottom wall, means supporting the receptacle from the deck for selective movement through the opening to a lowered position with the bottom wall of the receptacle submerged in the water below the water line of the craft and to a raised position with the bottom wall of the receptacle above the water line of the craft, one of said receptacle walls having an opening therethrough in open communication with the body of water when the receptacle is in its lowered position for flow of water into the receptacle, means carried by the craft for introducing a material into the receptacle for forming an aqueous mixture of the material and the water therein, and means connected with the receptacle for discharging the aqueous mixture over a desired surface, whereby the material may be mixed with water from the surrounding body of water thus eliminating storage of water on the craft, and the receptacle may be raised to enable relatively unimpeded movement of the craft through the body of water.

2. A water-borne craft as called for in claim 1, wherein the deck thereof is supported by a pair of elongate pontoons spaced apart to permit the free and unobstructed movement of the receptacle between fully raised and fully lowered positions.

3. A water-borne craft as called for in claim 1, which includes a normally open inlet port in an end wall of the receptacle providing unrestricted entry of water into said receptacle when in a fully lowered position; and means operable for selectively closing said normally open inlet port.

4. A water-borne craft as called for in claim 1, which includes means in said receptacle for mechanically agitating the contents thereof; and drive means therefor which are secured to, carried by and movable with said receptacle.

5. A water-borne craft as called for in claim 1, wherein said means for discharging the material includes means for discharging the contents of the receptacle under pressure, through a nozzle from a location above the deck of said craft.

6. A water-borne craft as called for in claim 5, wherein the means for discharging the contents of the receptacle under pressure includes a pump which is secured to and carried by said deck.

7. A water-borne craft as called for in claim 6, which includes means for detachably connecting the inlet of said pump in communication with the fluid contents of said receptacle.

8. A water-borne craft as called for in claim 1, wherein said means for introducing material into the receptacle includes a hopper secured to and carried by said deck, and means for selectively controlling the gravitational discharge of the contents of the hopper into said receptacle.

9. A water-borne craft as called for in claim 8, wherein the hopper is mounted above and in substantial vertical alignment with the receptacle-receptive opening in the deck.

10. A water-borne craft as called for in claim 8, wherein means are provided for vibrating the hopper during the discharge of the contents thereof.

11. A water-borne craft as called for in claim 1, wherein the means connecting the receptacle to the deck for selective movement between fully raised and fully lowered positions comprises a pair of parallelogram linkages by which the side walls of the receptacle are connected to the deck; and means accessible above the deck for simultaneously actuating said linkages for disposing and locking said receptacle in and against accidental or unintentional dislodgement from its fully raised and lowered positions.

12. A water-borne craft as called for in claim 5, which includes a platform which is secured to, carried by and disposed in elevated position above the deck, and wherein the nozzle is accessible from and movable relative to said platform.

13. A water-borne craft as called for in claim 4, which includes a hopper mounted to discharge particulate material housed therein into said receptacle; a nozzle located above the deck of said craft; and a pump for delivering the contents of the receptacle, under pressure, to and for discharge through said nozzle during those periods of time when the receptacle is in a fully lowered position.

14. A water-borne craft as called for in claim 1, wherein the open top of the receptacle is substantially in the plane of the deck when in the fully lowered position.

15. A water-borne craft which includes a deck having a receptacle-receptive opening therein; a receptacle having bottom, opposite side and end walls, means connecting said receptacle to said deck for selective movement between a fully raised position wherein the bottom wall of the receptacle is disposed at or above the water line of the craft, and a fully lowered position for disposing a portion of the receptacle and the bottom wall submerged beneath said water line, a hopper secured to and carried by said deck, and means for selectively controlling the gravitational discharge of the contents of the hopper into said receptacle.

16. A water-borne craft which includes a deck having a receptacle-receptive opening therein; a receptacle having bottom, opposite side and end walls, means connecting said receptacle to said deck for selective movement between a fully raised position wherein the bottom wall of the receptacle is disposed at or above the water line of the craft, and a fully lowered position for disposing the bottom wall submerged beneath said water line, said means connecting the receptacle to the deck for selective movement between fully raised and fully lowered positions comprising a pair of parallelogram linkages by which the side walls of the receptacle are connected to the deck; and means accessible above the deck for simultaneously actuating said linkages for disposing and locking said receptacle in and against accidental or unintentional dislodgement from its fully raised and lowered positions.

* * * * *